(12) United States Patent
Stuhec

(10) Patent No.: US 7,711,676 B2
(45) Date of Patent: May 4, 2010

(54) TRACKING USAGE OF DATA ELEMENTS IN ELECTRONIC BUSINESS COMMUNICATIONS

(75) Inventor: Gunther Stuhec, Heidelberg (DE)

(73) Assignee: SAP Aktiengesellschaft, Walldorf (DE)

( * ) Notice: Subject to any disclaimer, the term of this patent is extended or adjusted under 35 U.S.C. 154(b) by 738 days.

(21) Appl. No.: 10/986,628

(22) Filed: Nov. 12, 2004

(65) Prior Publication Data

US 2006/0106746 A1 May 18, 2006

(51) Int. Cl.
*G06F 17/30* (2006.01)
(52) U.S. Cl. .................... 707/1; 707/9; 705/50
(58) Field of Classification Search ............ None
See application file for complete search history.

(56) References Cited

U.S. PATENT DOCUMENTS

| | | | |
|---|---|---|---|
| 4,714,995 A | 12/1987 | Materna et al. | |
| 4,864,502 A | 9/1989 | Kucera et al. | |
| 5,089,814 A | 2/1992 | Deluca | |
| 5,130,924 A | 7/1992 | Barker et al. | |
| 5,339,392 A | 8/1994 | Risberg et al. | |
| 5,444,841 A | 8/1995 | Glaser et al. | |
| 5,694,598 A | 12/1997 | Durand et al. | |
| 5,717,923 A | 2/1998 | Dedrick | |
| 5,797,137 A | 8/1998 | Golshani et al. | |
| 5,899,988 A * | 5/1999 | Depledge et al. | 707/3 |
| 6,018,742 A | 1/2000 | Herbert, III | |
| 6,124,391 A | 9/2000 | Sun et al. | |
| 6,125,391 A | 9/2000 | Meltzer et al. | |
| 6,163,781 A | 12/2000 | Wess, Jr. | |
| 6,226,674 B1 | 5/2001 | Klish | |
| 6,226,675 B1 | 5/2001 | Meltzer et al. | |
| 6,366,917 B1 | 4/2002 | Herbert, III | |
| 6,401,085 B1 | 6/2002 | Gershman et al. | |
| 6,421,681 B1 | 7/2002 | Gartner et al. | |
| 6,490,695 B1 | 12/2002 | Zagorski et al. | |
| 6,535,919 B1 | 3/2003 | Inoue et al. | |
| 6,542,912 B2 | 4/2003 | Meltzer et al. | |
| 6,560,608 B1 | 5/2003 | Tomm et al. | |

(Continued)

FOREIGN PATENT DOCUMENTS

EP 1239375 9/2002

(Continued)

OTHER PUBLICATIONS

Hong Su, Harumi, Kuno, and Elke A. Rundensteiner, "Automating the Transformation of XML Documents," 2001, The ACM Digital Library, pp. 68-75.

(Continued)

*Primary Examiner*—Neveen Abel Jalil
*Assistant Examiner*—Kellye D Buckingham
(74) *Attorney, Agent, or Firm*—Fish & Richardson P.C.

(57) ABSTRACT

Methods and apparatus, including computer program products for tracking usage of business data elements include receiving an electronic document that includes instances of business data elements and identifying an instance of a particular business data element in the electronic document. A counter associated with the particular business data element is incremented based on the identified instance. The electronic document has a format defined by a business communication schema, and the business communication schema includes a set of predefined business data elements for use in transacting electronic business.

30 Claims, 5 Drawing Sheets

U.S. PATENT DOCUMENTS

| | | | |
|---|---|---|---|
| 6,571,239 B1 | 5/2003 | Cole et al. | |
| 6,591,260 B1 | 7/2003 | Schwarzhoff et al. | |
| 6,606,462 B2 | 8/2003 | Siegel et al. | |
| 6,662,237 B1 | 12/2003 | Leckie | |
| 6,694,338 B1 | 2/2004 | Lindsay | |
| 6,757,739 B1 | 6/2004 | Tomm et al. | |
| 6,785,538 B2 | 8/2004 | Nihei | |
| 6,789,216 B2 | 9/2004 | Zagorski et al. | |
| 6,801,201 B2 | 10/2004 | Escher | |
| 6,879,994 B1 | 4/2005 | Matsliach et al. | |
| 6,910,182 B2 | 6/2005 | Huang | |
| 6,938,044 B1 | 8/2005 | Milby | |
| 6,941,511 B1 | 9/2005 | Hind et al. | |
| 6,959,416 B2* | 10/2005 | Manning et al. | 715/513 |
| 6,985,905 B2 | 1/2006 | Prompt et al. | |
| 7,028,312 B1 | 4/2006 | Merrick et al. | |
| 7,058,645 B2 | 6/2006 | Seto et al. | |
| 7,069,020 B2 | 6/2006 | Chung | |
| 7,080,083 B2 | 7/2006 | Kim et al. | |
| 7,127,516 B2 | 10/2006 | Inoue et al. | |
| 7,136,467 B2* | 11/2006 | Brockman et al. | 379/112.06 |
| 7,146,399 B2 | 12/2006 | Fox et al. | |
| 7,155,665 B1 | 12/2006 | Browne et al. | |
| 7,181,463 B2 | 2/2007 | Moore et al. | |
| 7,194,695 B1 | 3/2007 | Racine et al. | |
| 7,225,203 B2 | 5/2007 | Kohno | |
| 7,245,924 B2 | 7/2007 | Katagishi et al. | |
| 7,246,128 B2 | 7/2007 | Jordahl | |
| 7,275,079 B2 | 9/2007 | Brodsky et al. | |
| 7,281,018 B1 | 10/2007 | Begun et al. | |
| 7,313,756 B2 | 12/2007 | Panditharadhya et al. | |
| 7,373,595 B2 | 5/2008 | Jones et al. | |
| 7,421,395 B1 | 9/2008 | Link et al. | |
| 2001/0034733 A1 | 10/2001 | Prompt et al. | |
| 2002/0116389 A1 | 8/2002 | Chen et al. | |
| 2002/0120506 A1 | 8/2002 | Hagen | |
| 2002/0145944 A1 | 10/2002 | Wright | |
| 2002/0147730 A1 | 10/2002 | Kohno | |
| 2002/0147748 A1 | 10/2002 | Huang et al. | |
| 2003/0028857 A1 | 2/2003 | Zagorski et al. | |
| 2003/0083077 A1 | 5/2003 | Chung | |
| 2003/0120665 A1 | 6/2003 | Fox et al. | |
| 2003/0149934 A1 | 8/2003 | Worden | |
| 2003/0212904 A1 | 11/2003 | Randle et al. | |
| 2004/0158567 A1 | 8/2004 | Dettinger et al. | |
| 2004/0162871 A1 | 8/2004 | Pabla et al. | |
| 2004/0177160 A1 | 9/2004 | Seto et al. | |
| 2004/0203620 A1 | 10/2004 | Thome et al. | |
| 2004/0205621 A1* | 10/2004 | Johnson et al. | 715/523 |
| 2005/0033719 A1 | 2/2005 | Tirpak et al. | |
| 2005/0144277 A1 | 6/2005 | Flurry et al. | |
| 2005/0166223 A1 | 7/2005 | Krasinski | |
| 2005/0198068 A1* | 9/2005 | Mukherjee et al. | 707/104.1 |
| 2005/0198074 A1 | 9/2005 | Khayter et al. | |
| 2005/0228803 A1 | 10/2005 | Farmer et al. | |
| 2005/0240875 A1 | 10/2005 | Takayama et al. | |
| 2005/0278372 A1 | 12/2005 | Shaburov et al. | |
| 2006/0025987 A1 | 2/2006 | Baisley et al. | |
| 2006/0085450 A1 | 4/2006 | Seubert et al. | |
| 2006/0095288 A1 | 5/2006 | Amys et al. | |
| 2006/0101068 A1 | 5/2006 | Stuhec | |
| 2006/0106746 A1 | 5/2006 | Stuhec | |
| 2006/0106824 A1 | 5/2006 | Stuhec | |
| 2006/0136489 A1 | 6/2006 | Thome et al. | |
| 2006/0178868 A1 | 8/2006 | Billerey-Mosier | |
| 2006/0184539 A1 | 8/2006 | Blake et al. | |
| 2007/0101391 A1 | 5/2007 | Hwang | |
| 2007/0118354 A1 | 5/2007 | Stuhec | |
| 2007/0150387 A1 | 6/2007 | Seubert et al. | |

FOREIGN PATENT DOCUMENTS

| | | |
|---|---|---|
| EP | 1293850 | 3/2003 |
| EP | 1424643 | 6/2004 |
| EP | 1793288 | 6/2007 |
| WO | WO 98/40795 | 9/1998 |
| WO | WO 01/53967 | 7/2001 |
| WO | WO 01/055891 | 8/2001 |
| WO | WO 01/63477 | 8/2001 |

OTHER PUBLICATIONS

L. M. Haas, R. J. Miller, B. Niswonger, M. Tork Roth, P. M. Schwarz, and E. L. Wimmers, "Transforming Heterogeneous Data with Database Middleware: Beyond Integration," Copyright 1997, Computer Society Technical Committee on Data Engineering, pp. 1-6.

Hong-Hai Do and Erhard Rahm, "COMA—A system for flexible combination of schema matching approaches," Aug. 2002, Proc. 28th Intl. Conference on Very Large Databases (VLDB), Hongkong, pp. 1-12.

Hong-Hai Do, Sergey Melnik, and Erhard Rahm, "Comparison of Schema Matching Evaluations," Oct. 2002, Proc. GI-Workshop "Web and Databases", Erfurt, pp. 1-15.

Jayant Madhavan, Philip A. Bernstein, and Erhard Rahm, "Generic Schema Matching with Cupid," 2001, Proceedings of the $27^{th}$ VLDB Conference, pp. 49-58.

Jayant Madhaven, Philip A. Bernstein, and Erhard Rahm, "Generic Schema Matching with Cupid," Aug. 2001, Microsoft Research, MSR-TR-2001-58, pp. 1-15.

AnHai Doan, Jayant Madhaven, Pedro Domingos, and Alon Halevy, "Learning to Map between Ontologies on the Semantic Web," May 2002, Proceedings of the 11th International World Wide Web Conference, pp. 662-673.

Sergey Melnik, Hector Garcia-Molina, and Erhard Rahm, "Similarity Flooding: A Versatile Graph Matching Algorithm and its Application to Schema Matching," 2002, Proc. $18^{th}$ Int'l Conf. on Data Engineering (ICDE), pp. 1-12.

Lucian Popa, Yannis Velegrakis, Renee J. Miller, Mauricio A. Hernandez, Ronald Fagin, "Translating Web Data," 2002, The Eleventh International WWW Conference, pp. 1-12.

A Complete Family of On-Demand SRM Solutions [online]. Perfect Commerce, 2005. Retrieved from the Internet <URL: www.web.archive.org/web/20060706034828/www.perfect.com/home/index/html>, 2 pages.

Adobe LiveCycle Designer FAQ; Adobe Systems Incorporated; document undated; 3 pages, Dec. 2004.

Ahmed et al.; "Verification of Data in Staging Schema, Mapping between Source Tables and Materialized Views"; 2005.

APACS—the UK Payments Association [online]. APACS, 2005. Retrieved from the Internet <URL: web.archive.org/web/20060711112524/http://www.apacs.org..uk>, 1 page.

Architecture of Integrated Information System [online]; Wikipedia; retrieved from the Internet <URL: http://en.wikipedia.org/wiki/Architecture_of_Integrated_Information_Systems>, Oct. 30, 2007.

BI/Query Queries Guide; Hummingbird, Ltd. [online]; retrieved form the Internet <URL: http://www.notes.queensu.ca/uisadmin.nsf/579a5e3cc0e046c085256833007715cc/$FILE/queries_guide.pdf>; 6 pages, 2000.

Brown, P.; "Information Architecture with XML: A Management Strategy"; John Wiley & Sons; Hoboken; 2003.

Business Process Modeling Notation (BPMN) Information [online]; OMG/BPMN; retrieved from the Internet <URL: http://web.archive.org/web/20061011235521/http://www.bpmn.org>, 2007.

Celko, Joe; "Joe Celko's SQL for Smarties: Advanced SQL Programming"; $2^{nd}$ Edition; 2000.

Chen et al.; "Managing Semantic Metadata for the Semantic Grid"; Proceedings of the Knowledge Grid and Grid Intelligence Workshop; Beijing, China; 2004; 9 pages.

CIDX-Open Standards that Open Markets [online]. CIDX, 2006. Retrieved from the Internet <URL: www.web.archive.org/web/20060708031302/http://www.cidx.org>, 2 pages, 2006.

Contivo VMS [online]; retrieved from the Internet <URL: http://www.contivo.com/contivovms.html>, 2005.

Core Components Technical Specification—Part 8 of the ebXML Framework [online]; UN/CEFACT; 2003; retrieved from the Internet <URL: http://www.unece.org/cefact/ebxml/CCTS_V2-01_Final.pdf>, 113 pages.

Core Components Technical Specification v2.01—Part 8 of the ebXML Framework; UN/CEFACT; Nov. 15, 2003; pp. 1-113.

Crawford, Mark (Lead Ed.); "Oasis Universal Business Language (UBL) Naming and Design Rules"; Nov. 15, 2004.

Davis, J.; "Context Tailor: Towards a Programming Model for Context-Aware Computing" International Middleware Conference Workshop Proceedings—Middleware for Pervasive and Ad Hoc Computing; Jun. 16-20, 2003; Rio de Janeiro, Brazil; pp. 68-75.

Decker, S. et al.; "ONTOBROKER: Ontology-based Access to a Distributed and Semi-Structured Information"; Kluwer Academic Publishers; 1998; pp. 1-20.

Designing Interfaces and Proxy Generation [online]; SAP; retrieved from the Internet <URL: http://help.sap.com/saphelp_nw2004s/helpdata/n/ba/d4c23b95c8466ce10000000a114084/>; 2 pages, 2004.

Do et al.; "COMA—A System for Flexible Combination of Schema Matching Approaches"; Proceedings of the 28th VLDB Conference; Hong Kong; 2002; 12 pages.

Driving Automated Integration Today [online]; Contivo; retrieved from the Internet <URL: http://web.archive.org/web/20061017222738/http:/www.contivo.com/index/html>, 2004.

ebXML Business Process Specification Schema Version 1.01 [online]; Oasis; 2001; retrieved from the Internet <URL: http://www.ebxml.org/specs/ebBPSS.pdf>.

Embley et al.; "Automatic Direct and Indirect Schema Mapping: Experiences and Lessons Learned"; Dec. 2004.

Final Committee Draft ISO/IEC FCD—Information Technology—Metadata Registries (MDR)—Part 5—Naming and Identification Principles; ISO/IEC document dated Jan. 8, 2004; 26 pages.

FlexiSoft Solutions; retrieved from the Internet <URL: http://www.flexisoftsolutions.com/Products/SM2004/SM2004.aspx>; 4 pages, 2004.

GEFED EDIFIX; "EDIFIX Functions" [online]; Xenos; 2002; retrieved from the Internet <URL: http://www.gefeg.com/en/edifix/fx_functions.htm>.

GoXML Registry [online]; Xenos; 2002; retrieved from the Internet <URL: http://www.xmlglobabl.com/solutions/prod_goxml_registry.asp>.

Goyal; "An XML Schema Naming Assister for Elements and Types"; National Institute of Standards and Technology; retrieved from the Internet <URL: http://www.mel.nist.gov/msidlibrary/doc/NISTIR7143.pdf>; 12 pages, 2009.

Gundry, Kathleen; SAIC, Namespaces and 11179; Jul. 26, 2002; 40 pages.

How to Solve the Business Standards Dilemma—CCTS Key Model Concepts; The SAP Developer Network; SAP AG, 2006; pp. 1-18.

How to Solve the Business Standards Dilemma—The Context Driven Business Exchange; The SAP Developer Network; SAG AG 2005; pp. 1-19.

InfoPath 2003 Product Overview; Microsoft Office Online; retrieved from the Internet <URL: http://www.microsoft.com/office/infopath/prodinfo/overview.mspx>.

Information Technology—Metadata Registries (MDR)—Part 2: Classification; International Standard ISO/IEC 11179-2; Nov. 15, 2005; 16 pages.

Information Technology—Metadata Registries (MDR)—Part 1: Framework; International Standard ISO/IEC 11179-1; Sep. 15, 2004; 32 pages.

Information Technology—Metadata Registries (MDR)—Part 3: Registry Metamodel and Basic Attributes; International Standard ISO/IEC 11179-3; Feb. 15, 2003; 108 pages.

Information Technology—Metadata Registries (MDR)—Part 4: Formulation of Data Definitions; International Standard ISO/IEC 11179-04; Jul. 15, 2004; 16 pages.

Information Technology—Metadata Registries (MDR)—Part 5: Naming and Identification Principles; International Standard ISO/IEC 11179-5; Sep. 1, 2005; 20 pages.

Information Technology—Metadata Registries (MDR)—Part 6: Registration; International Standard ISO/IEC 11179-6; Jan. 15, 2005.

Information Technology—Specification and Standardization of Data Elements—Part 5: Naming and Identification Principles for Data Elements; ISO/IEC document dated Dec. 1, 1995; 20 pages.

ISO/IEC 11179 International Standard-Information Technology: Specification and Standardization of Data Elements (Part 5: Naming and Identification Principles for Data Elements), First Edition, Dec. 1, 1995.

ISO/IEC 13250, Topic Maps, Information Technology, Document Description and Processing Languages; Dec. 3, 1999; 47 pages.

Jurgensen, T.; "Report on Contivo Product Workshop made by Contivo, C.A.S. and SAPMarkets"; SAP Markets, Product Workshop on Contivo; St. Leon Rot; Aug. 1-2, 2001; 5 pages.

Kesseler; "A Schema Based Approach to HTML Authoring"; Aug. 2000; pp. 1-17.

Kifer, M. et al.; "Logical Foundations of Object-Oriented and Frame-Based Languages"; J. Assoc Computing Machinery; May 1995; pp. 1-100.

Kifer, M.; "F-Logic: A Higher-Order Language for Reasoning about Objects, Inheritance, and Scheme"; Jun. 3, 1997; pp. 1-21.

Know How to Use Know-How [online]. Ontoprise, 2006. Retrieved from the Internet <URL: http://web.archive.org/web/20060208064330/www.ontoprise.de/content/index_eng.html>.

Message Type [online]; SAP; retrieved from the Internet <URL: http://help.sap.cm.saphelp_nw2004s/helpdata/en/2d/c0633c3a892251e10000000a114084>; 2 pages, 2004.

Oasis ebXML Registry TC [online]; Oasis; 2005; retrieved from the Internet <URL: http://www.oasis-open.org/committees/tc_home.php?wg_abbrev=regrep>.

Oasis Universal Business Language (UBL) TC [online]. Oasis. Retrieved from the Internet <URL: www.oasis-open.org/committees/tc_home/php?wg_abbrev=ubl>, 7 pages, 2004.

Office Action issued in U.S. Appl. No. 11/063,000 on Oct. 9, 2008; 16 pages.

Office Action issued in U.S. Appl. No. 10/990,898 on Apr. 17, 2008; 10 pages.

Office Action issued in U.S. Appl. No. 10/990,898 on Jun. 14, 2007; 11 pages.

Office Action issued in U.S. Appl. No. 10/990,898 on May 8, 2009; 12 pages.

Office Action issued in U.S. Appl. No. 10/990,898 on Nov. 27, 2007; 11 pages.

Office Action issued in U.S. Appl. No. 10/990,898 on Oct. 24, 2008; 12 pages.

Office Action issued in U.S. Appl. No. 11/063,000 on Apr. 17, 2009; 18 pages.

Office Action issued in U.S. Appl. No. 11/087,918 on Aug. 14, 2008; 20 pages.

Office Action issued in U.S. Appl. No. 11/087,918 on Jan. 28, 2008; 22 pages.

Office Action issued in U.S. Appl. No. 11/087,918 on Jul. 10, 2007; 18 pages.

Office Action issued in U.S. Appl. No. 11/087,918 on Jun. 9, 2009; 27 pages.

Office Action issued in U.S. Appl. No. 11/087,918 on Oct. 28, 2008; 25 pages.

Office Action issued in U.S. Appl. No. 11/088,158 on Jan. 25, 2008; 19 pages.

Office Action issued in U.S. Appl. No. 11/088,158 on Jul. 1, 2008; 18 pages.

Office Action issued in U.S. Appl. No. 11/088,158 on Jul. 18, 2007; 13 pages.

Office Action issued in U.S. Appl. No. 11/088,158 on Nov. 25, 2008; 21 pages.

Office Action issued in U.S. Appl. No. 11/285,368 on Apr. 4, 2008; 17 pages.

Office Action issued in U.S. Appl. No. 11/285,368 on Dec. 1, 2008; 17 pages.

Office Action issued in U.S. Appl. No. 11/285,368 on Jun. 3, 2009; 17 pages.
Office Action issued in U.S. Appl. No. 11/285,368 on Nov. 9, 2007; 12 pages.
Office Action issued in U.S. Appl. No. 11/286,732 on Dec. 11, 2008; 28 pages.
Office Action issued in U.S. Appl. No. 11/286,732 on Jun. 23, 2008; 24 pages.
Office Action issued in U.S. Appl. No. 11/286,762 on Dec. 11, 2007; 22 pages.
Office Action issued in U.S. Appl. No. 11/291,327 on Apr. 17, 2008; 16 pages.
Office Action issued in U.S. Appl. No. 11/291,327 on Mar. 6, 2009; 14 pages.
Office Action issued in U.S. Appl. No. 11/291,327 on Nov. 14, 2007; 7 pages.
Office Action issued in U.S. Appl. No. 11/291,327 on Oct. 2, 2008; 20 pages.
Office Action issued in U.S. Appl. No. 11/400,837 on Apr. 21, 2009; 12 pages.
Office Action issued in U.S. Appl. No. 11/400,837 on Nov. 14, 2008; 13 pages.
Office Action issued in U.S. Appl. No. 11/618,529 on Dec. 8, 2008; 9 pages.
Office Action issued in U.S. Appl. No. 11/618,529 on Jun. 3, 2009; 8 pages.
OntoBroker—The Power of Inferencing [online]. Ontoprise, 2005. Retrieved from the Internet <URL: http://web.archive.org/web/20051122071757/www.ontoprise.de/content/e3/e27/index_eng>.
OntoMap Light-Weigth Ontology Management Platform [online]; Sirma, 1993-2005; retrieved from the Internet <URL: http://www.ontotext.com/proiects/ontomap.html>.
Open Applications Group: Standards for Business Software Interoperability [online]. OAGi. Retrieved from the Internet <URL:www.webarchive.org/web/20060616190904/http:openapplications.org>, 3 pages, 2006.
Peng, J. et al.; "A Reference Data Model for NEESgrid Shake Table Experiments"; Proceedings of the International Symposium on Earthquake Engineering in the Past and Future Fifty Years; 2004; 10 pages.
Project: ebXML Registry/Repository: Summary [online]; SourceForge.net, 2005; retrieved from the Internet <URL: http://sourceforge.net/projects/ebsmlrr>.
RosettaNet Standards [online]. Rosettanet, 1998-2007. Retrieve from the Internet: <URL: www.portal.rosettanet.org/cms/sites/RosettaNet/Standards/RStandards/index.html>, 2 pages.
SAP Exchange Infrastructure; SAP; retrieved from the Internet <URL: http://help.sap.com/saphelp_erp2004/helpdata/en/0f/80243b4a66ae0ce10000000a11402f/c . . . >, 2004.
Searle, John R.; "Chomsky's Revolution in Linguistics"; The New York Review of Books; Jun. 29, 1972.
Search Report issued in European Application No. 06023849.0 on Mar. 22, 2007; 7 pages.
Search Report issued in European Application No. 06023585.0 on Feb. 22, 2007; 7 pages.
Search Report issued in European Application No. 06022546.3 on Mar. 15, 2007; 6 pages.
Search Report issued in European Application No. 06022715.4 on Jan. 22, 2007; 8 pages.
Schuldt, Ron; "Universal Data Element Framework (UDEF) Overview"; Open Group; San Francisco, CA; Jan. 24-28, 2005; 31 pages.
Stitzer, Alan; "UN/CEFACT (Core Components Technical Specification—Part 8 of the ebXML Framework)"; Nov. 15, 2003; Version 2.01.
Stuhec, G. and Crawford, M.; "How to Solve the Business Standards Dilemma—The CCTS Standards Stack"; SAP AG, 2006; pp. 1-13.
Stuhec, G.; "How to Solve the Business Standards Dilemma—The CCTS Based Core Data Types"; SAP AG, 2006; pp. 1-22.
Tao et al.; "Applying the Semantic Web to Manage Knowledge on the Grid"; E-Science AHM; Nottingham, England; 2004; 8 pages.
Tao et al.; "Semantic Web Based Content Enrichment and Knowledge Reuse in E-Science"; On the Move to Meaningful Internet Systems 2004: CoopIS, DOA, and ODBASE; 2004; 14:654-699.
The Company of the Open Standard Solutions [online]; ebXMLsoft, Inc.; 2001-2004; retrieved from the Internet <URL: http://www.ebsmlsoft.com>.
UN/CEFACT; "Core Components Technical Specification—Part 8 of the ebXML Framework" [oneline]; Nov. 15, 2003; retrieved from the Internet <URL: http://www.unece.org/cefact/ebxml/CCTSV2-01_Final.pdf>; pp. 1-113.
UN/CEFACT, ebXML Core Components Technical Specification, Version 1.85; Sep. 30, 2002; 118 pages.
UN/CEFACT, ebXML Requirements Specification, Version 1.06, ebXML Requirements Team; May 8, 2001; 43 pages.
UN/CEFACT, ebXML Technical Architecture Specification v1.0.4, ebXML Technical Architecture Project Team; Feb. 16, 2001; 39 pages.
UN/CEFACT's Modeling Methodology (UMM) in a Nutshell; undated manuscript, believed to have been published Nov. 15, 2006; retrieved from the Internet <URL: http://www.untmg.org/index.php?option=com_docman@task=docclick&Itemid=137&bid=55&limitstart=0&limit=5>.
UN/CEFACTt's Modeling Methodology (UMM): UMM Meta Model—Foundation Module Version 1.0 Technical Specification [online]; CEFACT Oct. 6, 2006; retrieved from the Internet <URL: http://www.unece.org/cefact/umm/UMM_Foundation_Module.pdf>.
Universal Data Element Framwork (UDEF) [online]; Oasis; May 23, 2005; retrieved from the Internet <URL: http://xml.coverpages.org/udef.html>.
xCBL 4.0 Final Release Now Available [online]. xCBL, 2000 Retrieved from the Internet: <URL: www.web.archive.org/web/20060619154652/http://www.xcbl.org>, 3 pages.
XForms—The Next Generation of Web Forms; W3C; Retrieved from the Internet <URL: http://www.w3.org/MarkUp/Forms>; 11 pages, 1999-2007.
XForms 1.1,; W3C Working Draft Nov. 15, 2004; retrieved from the Internet <URL: http://www.w3.org.TR/2004/WD-xforms11-20041115>; 26 pages.
XML Path Language (XPath) Version 1.0; W3C Recommendation; Nov. 16, 1999; W3C; retrieved from the Internet <URL: http://www.w3.org/TR/xpath>; 37 pages.
XML Schema; W3C; retrieved from the Internet <URL: http://www.w3.org/XML/Schema>; 16 pages, 2000-2007.
XML Schema, Part 2: Datatypes Second Edition [online]; W3C; 2004; retrieved from the Internet <URL: http://www.w3.org/TR/2004/REC-xmlschema-2-20041028>; 194 pages.
Trade Secret Material Not Open to Public. To Be Opened Only by Examiner or Other Authorized U.S. Patent and Trademark Office Employee (filed by Express Mail in the present Application on Jul. 1, 2009).

* cited by examiner

```
<xsd:complexType name="PeriodType" id="UN00000116">  ⎯305
  <xsd:sequence>
    <xsd:element name="DurationDateTime" id="UN00000117" minOccurs="0" maxOccurs="unbounded">  ⎯310
      <xsd:annotation>
        <xsd:appinfo>
320⎯    <FrequencyOfUsage>
            <CounterValue>1323</CounterValue>  ⎯325
            <LastUsageDate>2004-05-05</LastUsageDate>  ⎯330
            <UsedInMessages><MessageName>PurchaseOrder</MessageName></UsedInMessages>  ⎯335
            <CountingDuration>P1M</CountingDuration>  ⎯340
            <CountingMinValue>100</CountingMinValue>  ⎯345
          </FrequencyOfUsage>
        </xsd:appinfo>
        <xsd:appinfo source="urn:xyz:statistics"/>
      </xsd:annotation>
      <xsd:complexType>
        <xsd:simpleContent>
          <xsd:extension base="qdt:DurationDateTimeType"/>
        </xsd:simpleContent>
      </xsd:complexType>  ⎯315
    </xsd:element>
    <xsd:element name="Indicator" id="UN00000118" minOccurs="0" maxOccurs="unbounded">
      <xsd:annotation>
        <xsd:appinfo>
320⎯    <FrequencyOfUsage>
            <CounterValue>1323322</CounterValue>  ⎯325
            <LastUsageDate>2004-06-03</LastUsageDate>  ⎯330
            <UsedInMessages><MessageName>PurchaseOrder</MessageName></UsedInMessages>  ⎯335
          </FrequencyOfUsage>
        </xsd:appinfo>
      </xsd:annotation>
      <xsd:complexType>
        <xsd:simpleContent>
          <xsd:extension base="udt:IndicatorType"/>
        </xsd:simpleContent>
      </xsd:complexType>
    </xsd:element>
```

TRACKING USAGE OF DATA ELEMENTS IN ELECTRONIC BUSINESS COMMUNICATIONS

BACKGROUND

The present invention relates to data processing by digital computer, and more particularly to tracking usage of data elements in electronic business communications.

Companies have conventionally exchanged electronic business information using Electronic Data Interchange (EDI). While EDI has allowed companies to communicate more efficiently than through the use of traditional paper-based communications, smaller companies face challenges to participate in electronic business (or electronic collaboration). These companies need to invest in complex and expensive computer systems to be installed at local computers, or to register with marketplaces at remote computers accessible through the Internet. In either case, the companies are bound by the particulars of the local or remote computer systems. Changes lead to further costs for software, hardware, user training, registration, and the like.

More recently, the development of the Extensible Markup Language (XML) has offered an alternative way to define formats for exchanging business data. XML provides a syntax that can be used to enable more open and flexible applications for conducting electronic business transactions, but does not provide standardized semantics for messages used in business processes. Initiatives to define standardized frameworks for using XML to exchange electronic business data have produced specifications such as the Electronic Business Extensible Markup Language (ebXML) Core Components Technical Specification (CCTS) and ISO 11179, which is incorporated in ebXML CCTS. Despite the efforts of such initiatives to develop a single standard for conducting electronic business, a number of competing XML and non-XML-based standards and proprietary formatting schema have been developed and are in common use, including cXML, ebXML, SAP IDoc, SAP IFR XML, OAG BOD, ANSI X12, EDI-FACT, SWIFT, FIX, RosettaNet, and xCBL. In addition, some companies continue to use EDI-based systems based at least in part on their substantial investments in EDI integration. The large number of available schemas complicates efforts to conduct electronic business because a company will often adopt a particular schema that is not supported by all of the company's trading partners. Further complicating matters is the fact that many of the schema are constantly evolving (i.e., new business data elements are regularly added).

SUMMARY OF THE INVENTION

The present invention provides methods and apparatus, including computer program products, that implement techniques for tracking usage of business data elements from one or more communication schemas used for transacting electronic business.

In one general aspect, the techniques feature an electronic document having a format defined by a business communication schema. The business communication schema includes a set of predefined business data elements (e.g., business information entities) for use in transacting electronic business. An electronic document that includes instances of business data elements is received, and an instance of a particular business data element in the electronic document is identified. A counter associated with the particular business data element is incremented as a result of identifying the instance.

The invention can be implemented to include one or more of the following advantageous features. The electronic document includes instances of multiple business data elements from the set of predefined business data elements, and each of the business data elements has an associated counter. The electronic document is received from a translation module that is operable to translate the electronic document into the format defined by the business communication schema from a different communication schema format. One of the communication schema formats is an intermediary format in a business document translation infrastructure. The intermediary format is a format used for translating electronic documents from a first communication schema into a second communication schema. The first communication schema and the second communication schema are selected from a set of available communication schemas. The counters associated with each business data element is used by the translation module in selecting business data elements for translating electronic documents.

The translation module uses the counters to determine preferences among similar business data elements for translating electronic documents and/or the counters are used to identify business data elements as candidates for deletion from the business communication schema. In the latter case, a counter associated with each business data element is compared with a threshold value, and a user is notified if the counter is less than the threshold value. The counter for a particular business data element is incremented once in response to identifying one or more instances of the particular business data element in an electronic document or is incremented for each identified instance. A date for the electronic document is stored in association with the particular business data element as a result of identifying an instance of the particular business data element. The electronic document includes a message defined in the business communication schema, and the message includes the particular business data element. An identifier for the message is stored in association with the particular business data element as a result of identifying an instance of the particular business data element.

The invention can be implemented to realize one or more of the following advantages. Statistics and data on the actual usage of business data elements can be automatically collected during the exchange of electronic business documents. These statistics and data can be used to assist in automatic or semi-automatic mapping of business data elements between different business data schemas. The statistics can be used to establish a preference within the mapping procedure for more frequently used business data elements in cases where two or more similar business data elements are potentially applicable. For example, the most frequently used business data element from a set of similar elements can be automatically selected unless certain conditions for using another business data element are met.

By establishing preferences, the statistics and data can also help avoid the use of incorrect business data elements during mapping (e.g., elements that do not correctly represent the semantic meaning of the underlying data). The statistics and data can be used to identify business data elements that are not used or that are used infrequently. A schema that includes business data elements can be modified to selectively delete unused or infrequently used business data elements. Such deletions allow the schema to evolve toward a more streamlined set of elements, which can increase the efficiency of both mapping between different schemas and generating electronic documents based on the schema by removing the need to consider business data elements that have become obsolete as a result of evolving business requirements. CCTS-based schemas can be evolved to follow business requirements by extending the schemas to include new elements and restricting the schemas by removing unused elements. A selectively streamlined schema can also help avoid potential semantic misunderstandings resulting from the use of obsolete business data elements. The statistics can be used in semi-automatic modeling. Semi-automatic modeling provides and recommends only the more-frequently used business data elements and/or business data elements with a positive usage trend, among business data elements that are semantically similar. For example, a modeler writes a definition in a specific context for his required additional business information. The semi-automatic modeling approach searches for same or similar business data elements in the library that are appropriate for the defined requirements. If the system finds more than one similar business data elements in the repository, additional information about the frequency of usage of each business data element can be used to select an appropriate business data element. The statistics can also be used for modeling and optimization of new data models (e.g., if a complete new business document is required). Preferences for the more used business data elements and/or business data elements with a positive usage trend for use in the new data model can define a more efficient data model. Implementations of the invention provide one or more of the above advantages.

Details of one or more implementations of the invention are set forth in the accompanying drawings and in the description below. Further features, aspects, and advantages of the invention will become apparent from the description, the drawings, and the claims.

BRIEF DESCRIPTION OF THE DRAWINGS

FIG. 3 is an excerpt from a sample XML definition of a communication schema.

Like reference numbers and designations in the various drawings indicate like elements.

DETAILED DESCRIPTION

Figure 1:
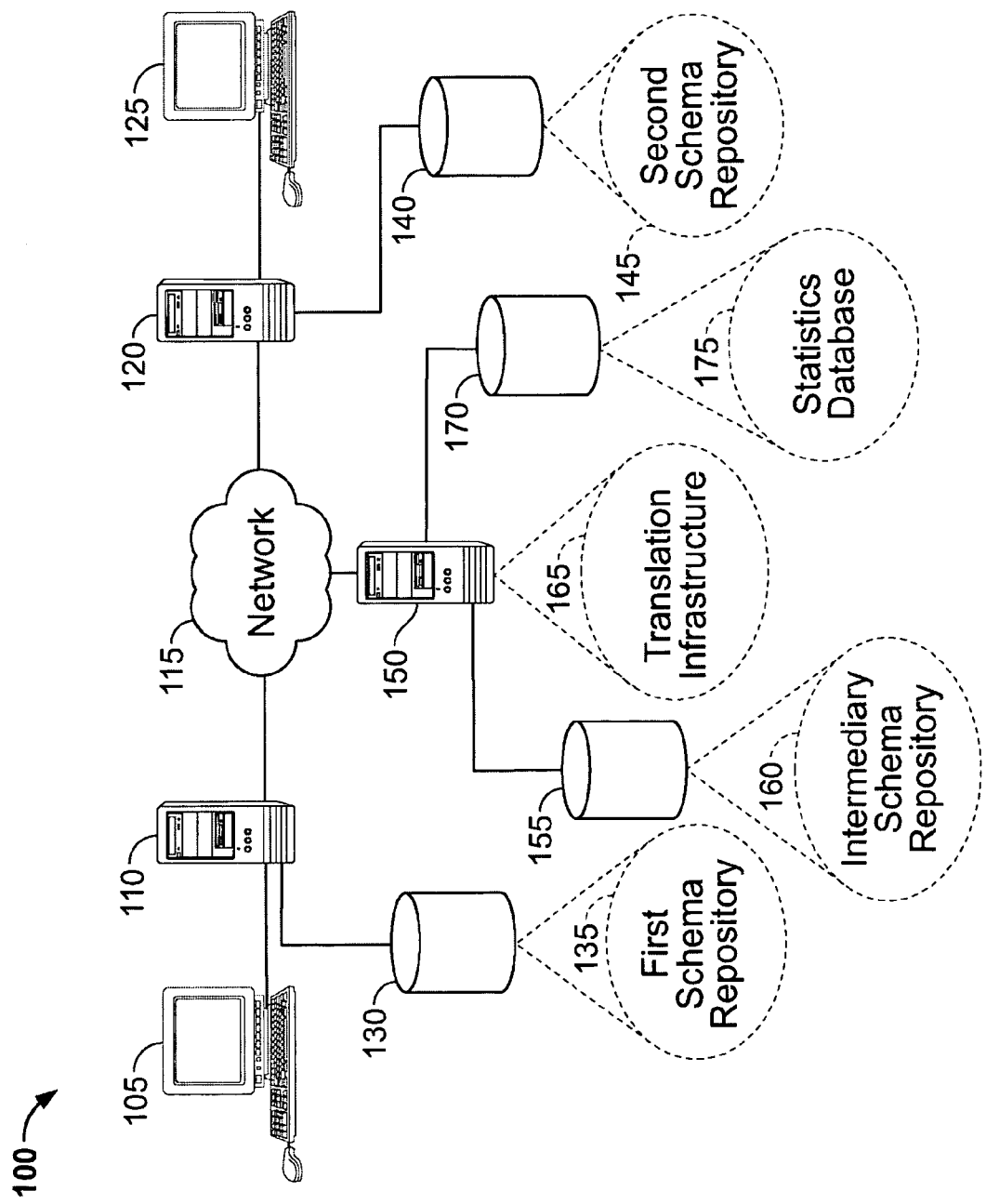
FIG. 1 is a block diagram of a system for transacting electronic business using one or more business communication schemas.

In general, electronic business communications can be conducted using electronic documents. An electronic document does not necessarily correspond to a file. A document may be stored in a portion of a file that holds other documents, in a single file dedicated to the document in question, or in multiple coordinated files. An electronic document used in transacting electronic business is formatted in accordance with one of a wide variety of available business communication schemas (e.g., EDIFACT, X12, xCBL, a CCTS-based schema, or IDoc). An electronic document can correspond to an electronic business message, transaction, group of related messages, or group of related transactions.

Each business communication schema includes a set of business data elements from which electronic documents can be constructed. For example, a purchase order electronic document can be constructed using an aggregation of business data elements that specify the buyer and the seller, identify the document as a purchase order, list the ordered products, specify delivery terms, and provide other relevant information. A communication schema can be defined using XML.

Business data elements for a communication schema are used to represent object classes (e.g., a person or an address), characteristics of an object class (e.g., a postal code), a business context (e.g., chemical industry), a data type (e.g., valid values for a characteristic), associations (e.g., between a person and an address), representation classes, messages, transactions, and the like. Each business data element in an electronic business framework typically includes a unique name. The unique name identifies the element and/or to indicate what is represented by values or sub-elements within the element. In some communication schemas, elements are defined by code names. For example, xCBL uses a numerical code to identify a data type for each instance of a business data element. Other communication schemas define elements using semantic names, which can include multiple concatenated terms that describe characteristics of the component. For example, ISO 11179, which is incorporated in CCTS, defines a naming convention in which each data element is described by a name that semantically describes the business data element ("address.street" or "party.company") and how it is represented (e.g., text or code).

A typical business communication schema will enable a large number of different transactions and/or messages using a large set of business data elements. Some of the business data elements are shared among multiple different transaction and/or message types while other business data elements may be associated with a particular transaction and/or message type. Business data elements in an electronic document are organized according to a format for the business communication schema, which can include a format that is common between different transaction and/or message types, and/or formatting characteristics that are specific to each transaction and/or message type.

FIG. 1 is a block diagram of a system 100 for transacting electronic business using one or more business communication schemas. The system 100 includes a first monitor 105 connected to a first computer 110 and a second monitor 125 connected to a second computer 120. Electronic business communications between the first computer 110 and the second computer 120 are conducted over a network 115, such as the Internet, in accordance with a business communication schema. To facilitate electronic business communications, the first computer 110 includes a data storage device 130 containing a first schema repository 135 and the second computer 120 includes a data storage device 140 containing a second schema repository 145. Each of the first schema repository 135 and the second schema repository 145 store metadata describing one or more formats defined by a business communication schema.

The monitor 105 displays user interfaces for allowing a user to enter or otherwise define business data to be included in an electronic document. The first computer 110 generates the electronic document in accordance with the metadata stored in the first schema repository 135. In particular, the first computer 110 organizes the data entered by the user according to a communications schema format defined in the first schema repository 135. The generated electronic document can then be transmitted over the network 115 to a receiving entity, such as the second computer 120. The second computer 120 is capable of interpreting received electronic documents in accordance with the metadata stored in the second schema repository 145. In particular, the second computer 120 interprets data contained in a received electronic document according to a communications schema format defined in the second schema repository 145.

One or more communications schemas can be defined in each schema repository 135 and 145. In some cases, two enterprises that wish to transact electronic business agree to use a particular communication schema that both enterprises support. In other words, the same communication schema is defined in both the first schema repository 135 and the second schema repository 145. In such a case, an electronic document generated by the first computer 110 using the particular communication schema can be interpreted by the second computer 120 using the metadata in the second schema repository 145, and the monitor 125 can display user interfaces that include the data contained in the electronic document.

In other situations, two enterprises that wish to transact electronic business use communication schemas that are incompatible with one another. For example, a first communication schema is defined in the first schema repository 135, and a different communication schema is defined in the second schema repository 145. If an electronic document is generated by the first computer 110 and sent directly to the second computer 120, the second computer 120 is unable to interpret the electronic document because the second schema repository 145 does not include information for mapping business data elements between different schemas.

To exchange an electronic document between computers 110 and 120 that support different communication schemas, it is possible to translate the electronic document from the first communication schema format to the second communication schema format using a translation infrastructure 165 in an intermediary computer 150. The intermediary computer 150 includes a storage device 155 containing an intermediary schema repository 160. The intermediary schema repository 160 includes metadata defining both the first and second communication schemas. To communicate with the second computer 120, the first computer 110 sends an electronic document generated using the first communication schema to the translation infrastructure 165. The translation infrastructure 165 translates the electronic document from the first communication schema format to the second communication schema format, including translating the business data elements, using the metadata stored in the intermediary schema repository 160. The translated electronic document is sent to the second computer 120, which interprets the included data using the second communication schema metadata stored in the second schema repository 145.

In some implementations, the translation infrastructure 165 translates electronic documents from the first communication schema format directly to the second communication schema format. In other implementations, the translation infrastructure 165 translates electronic documents from the first communication schema format to an intermediary communication schema format and then from the intermediary communication schema format to the second communication schema format. The intermediary communication schema format is based on the UN/CEFACT XML Naming and Design Rules for UN/CEFACT CCTS. The translation infrastructure 165 can generally translate between any number of different communication schema formats using metadata describing the various different communication schema formats stored in the intermediary schema repository 160. Metadata defining a library of business data elements can also include data necessary for mapping the business data elements to other formats. The translation infrastructure 165 can be, for example, the Exchange Infrastructure (XI), available from SAP AG of Walldorf (Baden), Germany.

In addition to translating electronic documents, the translation infrastructure 165 also collects statistics and other information relating to electronic documents that pass through the intermediary computer 150. For example, the translation infrastructure 165 counts instances of business data elements that are included in electronic documents. A counter corresponding to each business data element in a communication schema is incremented when the translation infrastructure 165 identifies an instance of the business data element. In some implementations, the counter is incremented for each separate instance of the business data element in an electronic document. Alternatively, the counter is incremented only once for each electronic document that includes the business data element regardless of how many instances are included in the electronic document.

Additional data that can be collected includes a name or other identifier for each message or transaction that includes one or more instances of the business data element and/or a date or time that the electronic document is sent, received, or translated. The additional data can also include statistics used to identify usage trends (e.g., increasing, decreasing, and cyclical usage trends) by storing counter values and other data for multiple different time periods. The value of the various counters and the additional data collected is stored in a statistics database 175 contained in a storage device 170 for the intermediary computer 150. The statistics database 175 can also be stored in the storage device 155 that contains the intermediary schema repository 160 or even as part of the metadata defining the communication schema that is stored in the storage device 155 (e.g., the counter and other data for each business data element can be stored as additional attributes of the complex Type element definition as illustrated in FIG. 3). The counter values and the other data can be used to determine which business data elements should be favored in mapping procedures, which business data elements can be deleted, which business data elements are used only with specific messages or transactions, how to model new schema (e.g., an intermediary format), and how to optimize existing schema.

Statistics and other data can be collected for business data elements of the first communication schema, the intermediary communication schema, and/or the second communication schema as well as any other communication schemas supported by the translation infrastructure 165. Accordingly, the statistics database 170 can collect usage information for a number of different schemas. In addition, statistics and other data can be collected for business data elements independent of any translation involving a schema that includes the business data elements. For example, the statistics database 175 can be incorporated into the first computer 110 and/or the second computer 120 for collecting statistics on electronic documents sent from or received at the first computer 110 and/or the second computer 120, respectively. In addition, the translation infrastructure 165 and associated intermediary schema repository 160 do not need to be in a separate location or computer 150 but can be incorporated into the first computer 110 or second computer 120. In cases where a business data element includes multiple different instances (e.g., a generic element that is used in multiple different electronic documents), the instances can be related to one another in a hierarchy, and each instance can have its own corresponding counter. Furthermore, incrementing of counters can be based on the location of the business data element, which is expressed by an xPath navigation path.

Figure 2:
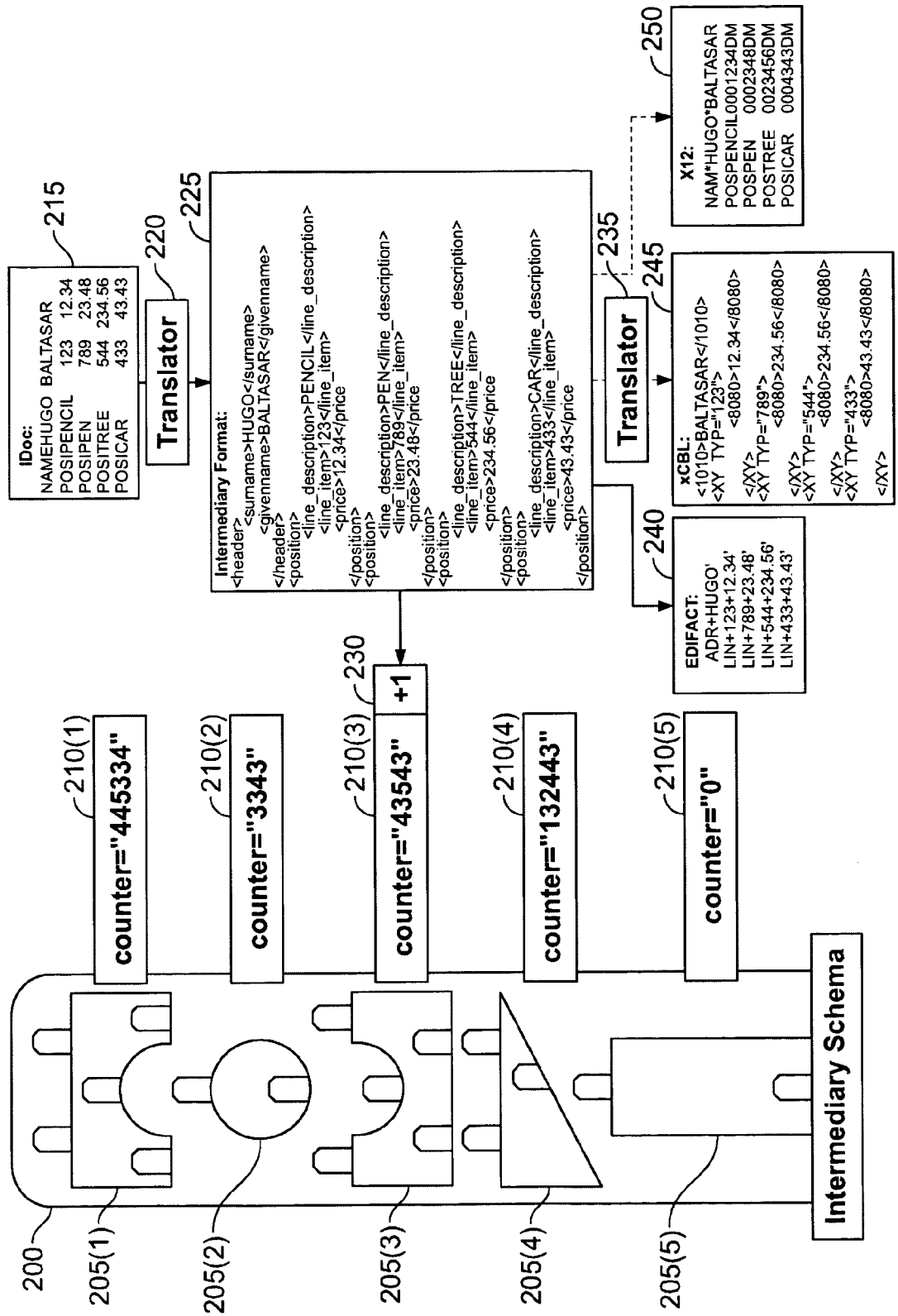
FIG. 2 is an illustration of counters for exemplary business data elements in an intermediary communication schema.

FIG. 2 is an illustration of counters for exemplary business data elements in an intermediary communication schema 200. The intermediary communication schema 200 includes multiple different business data elements 205, including an "Address.Details" element 205(1), a "Batch.Details" element 205(2), a "Price Component.Details" element 205(3), a "Batch.Toll Free.Indicator" element 205(4), and a "Price Component.Base Amount" element 205(5). Each business data element 205 can be an aggregation of more basic business data elements 205 and/or can be combined with other business data elements 205 to form a higher-level business data element 205 (e.g., a complex element or a message). Each business data element 205 has an associated counter 210 that is incremented when an instance of the corresponding business data element 205 is identified.

An electronic document formatted in accordance with an IDoc schema format 215 is received at a translation module 220. The translation module 220 translates the electronic document into an intermediary schema format 225. For each different business data element 205 of the intermediary schema that includes at least one instance, the counter 210 corresponding to the business data element 205 is incremented. For example, if the electronic document, after translation into the intermediary schema format, includes one or more instances of the "Price Component. Details" element 205(3), the corresponding counter 210(3) is incremented (as indicated at 230). After inspecting the electronic document for instances of the various business data elements of the intermediary schema 200, the electronic document is delivered to a translation module 235 for translation into one or more of an EDIFACT schema format 240, an xCBL schema format 245, and/or an X12 schema format 250.

Similar counters can also be used for counting instances of business data elements for incoming electronic document formats (e.g., the IDoc schema format 215) and outgoing electronic document formats (e.g., the EDIFACT schema format 240, the xCBL schema format 245, and/or the X12 schema format 250). In addition, during translation of electronic documents, the translation modules 220 and 235 can use the values stored in the counters 210 and/or counters for elements in the incoming and outgoing schema formats as well as other data relating to the business data elements 205 (e.g., stored in the statistics database 175). For example, a translation module 220 might compare the counter value 210(3) for the "Price Component.Details" element 205(3) and the counter value 210(5) for the "Price Component.Base Amount" element 205(5) to select the "Price Component.Details" element 205(3) over the "Price Component.Base Amount" element 205(5). In some cases, the selection might also take into account the messages in which each of multiple possible elements have historically been used (e.g., to select an element that, although used infrequently, is used with a particular message type while a more frequently used element has not previously been used with the particular message type).

FIG. 3 is an excerpt from a sample XML definition 300 of a communication schema. The XML definition 300 includes a "PeriodType" element 305 that is an aggregation of a number of sub-elements, including a "DurationDateTime" element 310 and an "Indicator" element 315. Each of the "DurationDateTime" element 310 and the "Indicator" element 315 include a "FrequencyofUsage" set of attributes 320. A "counter value" attribute 325 stores a value corresponding to the number of electronic documents in which an instance of the element 310 or 315 appeared. The value is incremented each time another electronic document that includes an instance of the element 310 or 315 is received. The "counter value" attribute 325 is used to determine whether a particular element 310 or 315 is used relatively frequently or infrequently.

A "last usage date" attribute 330 stores a date on which the most recent usage in an electronic document occurred. The "last usage date" attribute 330 can be used to determine if the particular element 310 or 315 has been used recently. A "used in messages" attribute 335 identifies one or more messages (e.g., message types) in which an instance of the element 310 or 315 appeared and can be used to identify elements 310 or 315 that are used with only a limited number of messages. A "counting duration" attribute 340 defines a time period for which statistics are collected before analyzing the results and/or clearing the counter. A "counting minimum value" attribute 345 defines a threshold counter value. If the value in the "counter value" element 325 is less than the threshold value, the element 310 will be flagged for possible deletion at the end of the time period defined in the "counting duration" attribute 340.

Additional attributes can also be included. For example, the XML definition 300 can include an "always required indicator" attribute for elements that should not be deleted from the XML definition 300. It is possible to maintain statistics and information on usage of such elements (e.g., for use in selecting among similar business data elements during translation processes), but the statistics will not be used to determine whether the element can be deleted.

Figure 4:
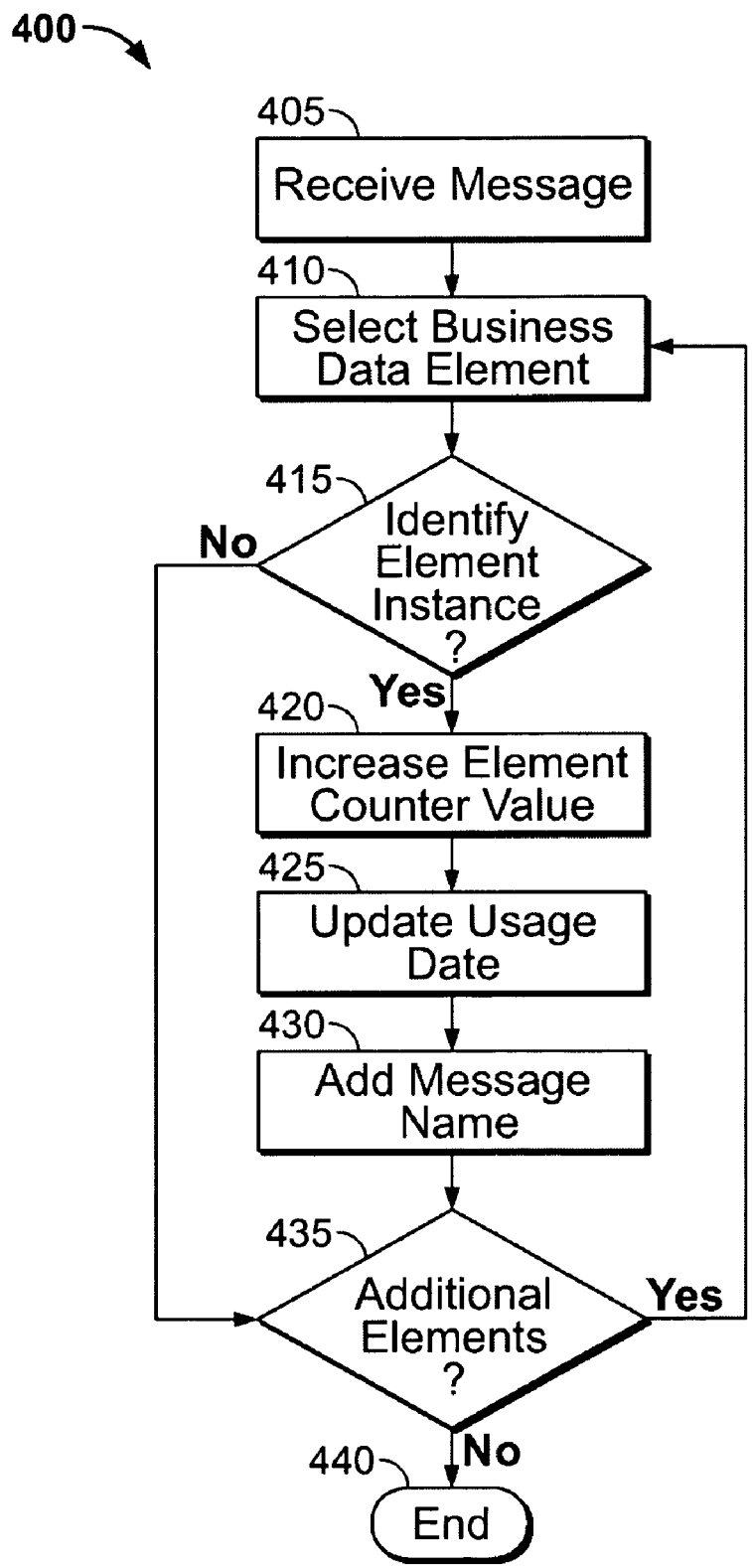
FIG. 4 is a flow diagram of a process for tracking usage of business data elements in received messages.

FIG. 4 is a flow diagram of a process 400 for tracking usage of business data elements in received messages. An electronic business message is received (405) at a translation module or during a process of sending or receiving a message from a transmitting computer (e.g., the first computer 110 of FIG. 1) or at a receiving computer (e.g., the second computer 120 of FIG. 1). The received message is interpreted, and a business data element for updating statistics is selected from the set of business data elements for a particular communication schema (410). It is determined whether an instance of the business data element exists in the message (415). If not, it is determined whether additional business data elements for the particular communication schema have not yet been checked (435). If there are additional data elements to be checked, the process 400 selects a new business data element (410).

If an instance of the business data element does appear in the message, a counter associated with the business data element is incremented (420). Data indicating the last usage date is updated to reflect the date of the current message (425), and the message name (e.g., describing the message type) is added to the usage information associated with the business data element (430). It is determined whether additional business data elements for the particular communication schema have not yet been checked (435). If so, the process 400 selects a new business data element (410). Otherwise, the process 400 ends (440).

Figure 5:
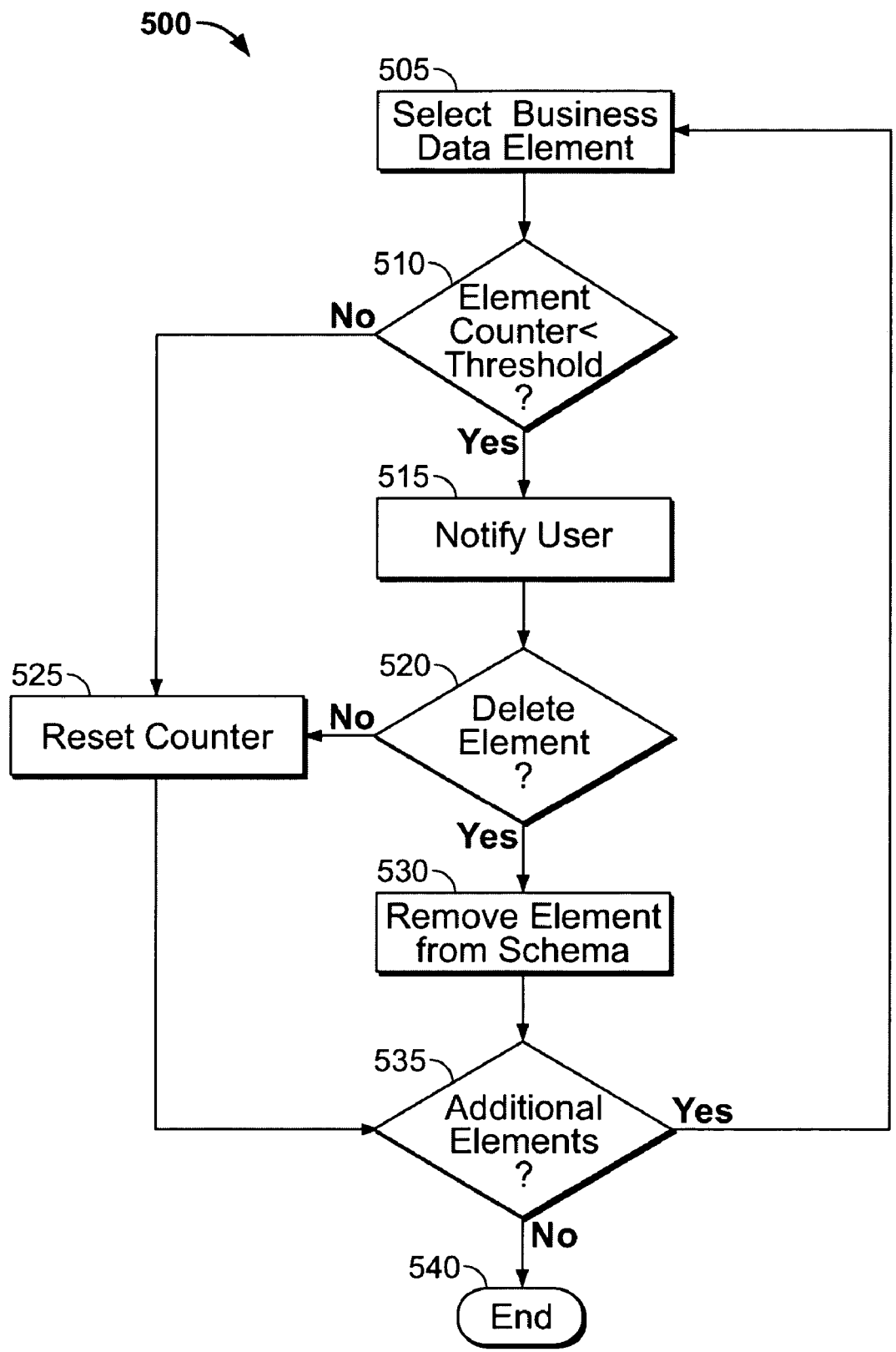
FIG. 5 is a flow diagram of a process for reviewing statistics and information relating to the business data elements in a communication schema.

FIG. 5 is a flow diagram of a process 500 for reviewing statistics and other information relating to the business data elements in a communication schema. Once a time period for counting instances of one or more business data elements (e.g., as defined by the "counting duration" attribute 340 of FIG. 3) has elapsed, a business data element from the communication schema is selected for purposes of reviewing the associated statistics (505). It is determined whether an instance counter corresponding to the selected business data element is less than a predefined threshold for the business data element (510). If not, it can be assumed that the business data element is used sufficiently frequently to warrant maintaining the business data element in the communication schema. Accordingly, the counter for the business data element is reset (525) to begin a new time period for counting instances, and it is determined whether statistics for additional elements still need to be checked (535).

If the instance counter corresponding to the selected business data element is less than a predefined threshold for the business data element, a user is notified and presented with statistics and/or other information relating to the business data element (515). For example, the user can be presented with the count value, the last usage date, and the message names in which the business data element appeared. In some cases, multiple different status levels corresponding to different threshold values can be used to indicate a level of urgency for deleting the particular business data element. For example, if usage of the business data element is significantly below the minimum threshold, it may indicate that the element is a more likely candidate for deletion. If the user decides to delete the element (520), the element is removed from the communication schema (530). Otherwise, the counter for the business data element is reset (525) to begin a new time period for counting instances. Once the element is deleted or the counter is reset, it is determined whether statistics for additional elements still need to be checked (535). If so, another business data element is selected (505) and the process 500 repeats. Otherwise, the process 500 ends (540).

The invention and all of the functional operations described in this specification can be implemented in digital electronic circuitry, or in computer software, firmware, or hardware, including the structural means disclosed in this specification and structural equivalents thereof, or in combinations of them. The invention can be implemented as one or more computer program products, i.e., one or more computer programs tangibly embodied in an information carrier, e.g., in a machine readable storage device or in a propagated signal, for execution by, or to control the operation of, data processing apparatus, e.g., a programmable processor, a computer, or multiple computers. A computer program (also known as a program, software, software application, or code) can be written in any form of programming language, including compiled or interpreted languages, and it can be deployed in any form, including as a stand alone program or as a module, component, subroutine, or other unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, sub programs, or portions of code). A computer program can be deployed to be executed on one computer or on multiple computers at one site or distributed across multiple sites and interconnected by a communication network.

The processes and logic flows described in this specification, including the method steps of the invention, can be performed by one or more programmable processors executing one or more computer programs to perform functions of the invention by operating on input data and generating output. The processes and logic flows can also be performed by, and apparatus of the invention can be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, the processor will receive instructions and data from a read only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. Information carriers suitable for embodying computer program instructions and data include all forms of non volatile memory, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, the invention can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The invention can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the invention, or any combination of such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

The invention has been described in terms of particular embodiments, but other embodiments can be implemented and are within the scope of the following claims. For example, the operations of the invention can be performed in a different order and still achieve desirable results. As one example, the process depicted in FIG. 4 does not require the particular order shown, or sequential order, to achieve desirable results (e.g., the operations 420, 425, and 430 can be performed in a different order). In certain implementations, multitasking and parallel processing may be preferable. Other embodiments are within the scope of the following claims.

What is claimed is:

1. A computer program product, embodied in a computer-readable medium, the computer program product being operable to cause data processing apparatus to:

a) receive, during a first time duration, a first electronic document being communicated between business entities, the first electronic document comprising instances of a plurality of business data elements, the first electronic document having a format corresponding to a business communication schema, wherein the business communication schema includes a set of predefined business data elements for use in electronically communicating business data from a first business entity to a second business entity;

b) identify an instance of a particular business data element in the first electronic document;

c) increment a counter associated with the particular business data element in response to identifying the instance of the particular business data element in the first electronic document;

d) receive, during the first time duration, a second electronic document being communicated between business entities;

e) identify an instance of the particular business data element in the second electronic document;

f) increment the counter associated with the particular business data element in response to identifying the instance of the particular business data element in the second electronic document;

g) subsequent to elapse of the first time duration, compare the counter with a threshold value;

h) based on the counter being less than the threshold value, delete the particular business data element from the business communication schema;

i) prior to deleting the particular business data element from the business communication schema, notify a user if the counter is less than the threshold value;

j) receive an instruction from the user to remove the particular business data element from the business communication schema:

k) reset the counter when the counter is at least equal to the threshold value;

l) begin a second time duration upon resetting of the counter; and m) repeat operations b) through h) for a third electronic document being communicated between business entities during the second time duration.

2. The computer program product of claim 1 wherein the particular business data element is a first business data element of the plurality of business data elements, the counter is a first counter of a plurality of counters associated with the plurality of business data elements, wherein the first counter is associated with the first business data element, the computer program product being operable to cause data processing apparatus to:

identify an instance of the first business data element in the first electronic document;

increment the first counter in response to identifying the instance of the first business data element;

identify an instance of a second business data element of the plurality of business data elements in the first electronic document; and increment a second counter of the plurality of counters, wherein the second counter is associated with the second business data element in response to identifying The instance of the second business data element.

3. The computer program product of claim 1 wherein the first electronic document is received from a translation module, the translation module operable to translate the first electronic document into the format corresponding to the business communication schema from a different communication schema format.

4. The computer program product of claim 3 wherein one of the formats corresponding to the business communication schema or the different communication schema format comprises a format compatible with Core Components Technical Specification.

5. The computer program product of claim 3 wherein one of the different communication schema format or the format corresponding to the business communication schema comprises an intermediary format in a business document translation infrastructure, the intermediary format comprising a format used for translating electronic documents from a format corresponding to a first communication schema into a format corresponding to a second communication schema, with the first communication schema and the second communication schema selected from a set of available communication schemas.

6. The computer program product of claim 3 wherein the computer program product is operable to cause data processing apparatus to translate the first electronic document from the format corresponding to the business communication schema into a different communication schema format.

7. The computer program product of claim 3 wherein the counter is a first counter of a plurality of counters associated with the plurality of business data elements, wherein the plurality of counters associated with the plurality of business data elements are used by the translation module in selecting business data elements for translating electronic documents.

8. The computer program product of claim 7 wherein the translation module uses the plurality of counters to determine preferences among similar business data elements for translating electronic documents.

9. The computer program product of claim 2 wherein the plurality of counters are used to perform one of modeling a business communication schema or modifying a business communication schema.

10. The computer program product of claim 2 wherein the plurality of counters associated with the plurality of business data elements are used to identify business data elements as candidates for deletion from the business communication schema.

11. The computer program product of claim 1 wherein the counter associated with the particular business data element is incremented only once in response to identifying more than one instance of the particular business data element.

12. The computer program product of claim 1 wherein the computer program product is operable to cause data processing apparatus to:

identify, in the first electronic document, a plurality of instances of the particular business data element; and increment the counter associated with the particular business data element for each identified instance of the plurality of instances.

13. The computer program product of claim 2 wherein the plurality of counters is used to identify usage trends of business data elements.

14. The computer program product of claim 1, the computer program product being operable to cause data processing apparatus to store a date for the first electronic document in response to identifying an instance of the particular business data element, wherein the stored date is associated with the particular business data element.

15. The computer program product of claim 1 wherein the first electronic document comprises a message defined in the business communication schema and the message includes the particular business data element, the computer program product being operable to cause data processing apparatus to store an identifier for the message in response to identifying an instance of the particular business data element, wherein the stored identifier for the message is associated with the particular business data element.

16. A system for tracking usage of business data elements, the system comprising:
   a) means for identifying instances of business data elements in a first plurality of electronic documents being communicated between business entities during a first time duration, each electronic document in the first plurality having a format corresponding to a business communication schema, wherein the business communication schema includes a set of predefined business data elements for use in electronically communicating business data from a first business entity to a second business entity;
   b) means for tracking usage of the business data elements across the first plurality of electronic documents in the set of predefined business data elements in response to identifying instances of the business data elements in the set of predefined business data elements in each electronic document;
   c) means for comparing a quantity of instances of the business data elements with threshold values, each threshold value corresponding to a particular business data element;
   d) means for removing the business data elements from the business communication schema when the quantity of instances of the business data elements is less than their corresponding threshold values during the first time duration;
   e) means for presenting a user with at least one of the quantity of instances and the business data elements prior to removing the business data elements from the business communication schema based on the quantity of instances being less than their corresponding threshold values;
   f) means for receiving an instruction from the user to remove the business data elements from the business communication schema;
   g) means for resetting the quantity of instance based on the quantity being at least equal to the corresponding threshold values;
   h) means for initiating a second time duration upon resetting of the Quantity; and
   i) means for repeating the functions of b) through d) for a second plurality of electronic documents being communicated between business entities during the second time duration.

17. The system of claim 16 wherein each electronic document has a format corresponding to one of a plurality of available business communication schemas and each available business communication schema has a corresponding set of predefined business data elements.

18. The system of claim 17 further comprising means for translating each electronic document at least from a first one of the plurality of available business communication schemas to a second one of the plurality of available business communication schemas, wherein the means for tracking usage of the business data elements tracks usage of business data elements for at least one of the first one of the plurality of available business communication schemas or the second one of the plurality of available business communication schemas.

19. The system of claim 16 further comprising means for monitoring the tracked usage of the business data elements.

20. The system of claim 16 wherein the tracked usage of the business data elements is used in selecting among business data elements in the set of predefined business data elements during a translation of an electronic document from a first one of a plurality of available business communication schemas to a second one of the plurality of available business communication schemas.

21. The system of claim 16 wherein the means for tracking usage comprises means for tracking usage trends.

22. A computer-implemented method for tracking usage of business data elements, the method comprising:
   a) receiving, during a first time duration, a first electronic document being communicated between business entities, the first electronic document comprising instances of a plurality of business data elements, the first electronic document having a format corresponding to a business communication schema, wherein the business communication schema includes a set of predefined business data elements for use in electronically communicating business data from a first business entity to a second business entity;
   b) identifying an instance of a particular business data element in the first electronic document;
   c) incrementing a counter associated with the particular business data element in response to identifying the instance of the particular business data element in the first electronic document;
   d) receiving, during the first time duration, a second electronic document being communicated between business entities;
   e) identifying an instance of the particular business data element in the second electronic document;
   f) incrementing the counter associated with the particular business data element in response to identifying the instance of the particular business data element in the second electronic document;
   g) subsequent to elapse of the first time duration, comparing the counter with a threshold value;
   h) based on the counter being less than the threshold value, removing the particular business data element from the business communication schema
   i) prior to removing the particular business data element from the business communication schema based on the counter being less than the threshold value, presenting a user with at least one of the counter and the particular business data element;
   j) receiving an instruction from the user to remove the particular business data element from the business communication schema;
   k) resetting the counter based on the counter being at least equal to the threshold value;
   l) initiating a second time duration upon resetting of the counter; and
   m) repeating steps b) through h) for a third electronic document being communicated between business entities during the second time duration.

23. The method of claim 22, wherein repeating the steps during the second time duration comprises:
   receiving, during the second time duration, the third electronic document being communicated between business entities;
   identifying at least one instance of the particular business data element in the third electronic document;
   incrementing the reset counter associated with the particular business data element for each instance of the particular business data element in the third electronic document;
   subsequent to elapse of the second time duration, comparing the reset counter with a threshold value; and based on the reset counter being less than the threshold value, removing the particular business data element from the business communication schema.

24. The method of claim 22 further comprising translating the first electronic document into the format corresponding to the business communication schema from a different communication schema format.

25. The method of claim 24 wherein one of the different communication schema format or the format corresponding to the business communication schema comprises an intermediary format in a business document translation infrastructure, the intermediary format comprising a format used for translating electronic documents from a format corresponding to a first communication schema into a format corresponding to a second communication schema, with the first communication schema and the second communication schema selected from a set of available communication schemas.

26. The method of claim 24 further comprising translating the first electronic document from the format corresponding to the business communication schema into a different communication schema format.

27. The method of claim 24 further comprising using the counter in selecting business data elements for translating electronic documents.

28. The method of claim 22 wherein the counter is used to identify usage trends of business data elements.

29. The computer program product of claim 1 wherein the business communication schema comprises a first business communication schema, the second electronic document has a format corresponding to a second business communication schema, and the first business communication schema is disparate from the second business communication schema.

30. The computer program product of claim 1 wherein the first electronic document being communicated between business entities is an electronic document being communicated among a first set of business entities, the second electronic document being communicated between business entities is an electronic document being communicated among a second set of business entities, and at least one of the first set of business entities is disparate from the second set of business entities.

* * * * *